United States Patent
Murao et al.

(10) Patent No.: US 7,472,883 B2
(45) Date of Patent: Jan. 6, 2009

(54) ELECTROMAGNETIC ACTUATOR

(75) Inventors: Yoshiyuki Murao, Kariya (JP); Jiro Kondo, Kariya (JP)

(73) Assignee: Denso Corporation (JP)

( * ) Notice: Subject to any disclaimer, the term of this patent is extended or adjusted under 35 U.S.C. 154(b) by 236 days.

(21) Appl. No.: 11/639,331

(22) Filed: Dec. 15, 2006

(65) Prior Publication Data

US 2007/0158605 A1    Jul. 12, 2007

(30) Foreign Application Priority Data

Jan. 10, 2006    (JP) .............................. 2006-002697

(51) Int. Cl.
F16K 31/02    (2006.01)

(52) U.S. Cl. .................... 251/129.15; 335/296; 335/299

(58) Field of Classification Search ........................ 251/129.09–129.22; 335/296, 297, 299
See application file for complete search history.

(56) References Cited

U.S. PATENT DOCUMENTS

| | | | | |
|---|---|---|---|---|
| 4,087,773 A | * | 5/1978 | Jencks et al. ................ | 335/243 |
| 5,992,822 A | * | 11/1999 | Nakao et al. ............ | 251/129.15 |
| 6,095,489 A | * | 8/2000 | Kaneko et al. ......... | 251/129.15 |
| 6,213,448 B1 | * | 4/2001 | Hayakawa et al. ..... | 251/129.15 |
| 6,883,544 B2 | | 4/2005 | Kawamura et al. | |

* cited by examiner

Primary Examiner—John K Fristoe, Jr.
(74) Attorney, Agent, or Firm—Nixon & Vanderhye PC (57) ABSTRACT

A bobbin and a magnetic transmitting/receiving stator are positioned by fitting two positioning projections provided for a bobbin flange into two positioning holes formed in a stator flange. The positioning hole has a circular shape and the positioning projection has a flat oval shape which matches a diameter part of the circular shape so that a resin-passing gap is formed between the shapes. Since the resin-passing gap plays the role equivalent to the role of a resin passing hole, the total number of positioning holes and the resin passing holes can be reduced, and magnetic flux passing through the stator flange can be prevented from decreasing. Since a post-forming resin flows through the resin-passing gap in the positioning part, the flow of the post-forming resin can be made uniform in the whole periphery, and occurrence of poor molding can be restricted.

5 Claims, 5 Drawing Sheets

ELECTROMAGNETIC ACTUATOR

CROSS-REFERENCE TO RELATED APPLICATION

This application is based on Japanese Patent Application No. 2006-2697 filed on Jan. 10, 2006, the disclosure of which is incorporated herein by reference.

FIELD OF THE INVENTION

The present invention relates to a solenoid in an electromagnetic actuator and, more particularly, to a resin mold made of a bobbin around which a coil is wound and a stator.

BACKGROUND OF THE INVENTION

An electromagnetic actuator obtained by molding a bobbin around which a coil is wound and a stator with a molding resin is known (for example, U.S. Pat. No. 6,688,334B2).

The bobbin and the stator are assembled at the time of molding a bobbin and a stator. The bobbin and the stator are positioned by fitting a positioning projection provided on a bobbin flange to a positioning hole formed in a stator flange as positioning means.

In the stator flange, a resin-passing hole for passing a molding resin has to be formed. A plurality of resin passing holes are formed in positions extending radially from the center of the stator flange to prevent occurrence of poor molding.

In the conventional art, the positioning holes are closed with the positioning projections. Consequently, poor molding has to be prevented by forming the plurality of resin passing holes, and many resin passage holes are necessary.

The stator flange is a part through which magnetic flux passes. When the number of resin passing holes is large, the amount of magnetic flux passing through the stator flange decreases. In particular, when the electromagnetic actuator is miniaturized, the sectional area of a magnetic circuit becomes insufficient due to the many resin-passing holes, and it disturbs miniaturization of the electromagnetic actuator.

The flow of the molding resin has to be made uniform in the whole periphery so as to prevent poor molding. In the conventional art, however, the molding resin does not flow smoothly in the positioning means (the fitting portion between the positioning holes and the positioning projections) of the bobbin and the stator, so that the flow of the molding resin cannot be made uniform in the whole periphery, and poor molding tends to occur.

SUMMARY OF THE INVENTION

The present invention has been achieved in view of the problems and an object of the invention is to provide an electromagnetic actuator in which an amount of magnetic flux passing through a stator flange is prevented from decreasing and occurrence of poor molding is suppressed.

In an electromagnetic actuator, a resin-passing gap which opens in the axial direction is formed between a positioning hole and a positioning projection which is fit in the positioning hole.

With the arrangement, a molding resin flows through the resin-passing gap at the time of molding. That is, the resin-passing gap in the positioning hole plays the role of a resin-passing hole. Consequently, the total number of the positioning holes and the resin passing holes formed in the stator flange can be made smaller than that in the conventional art, and the amount of magnetic flux passing through the stator flange can be prevented from decreasing. Since the amount of magnetic flux passing through the stator flange can be prevented from decreasing, even when the diameter of the stator flange is made smaller, the magnetic flux amount can be assured, and the electromagnetic actuator can be miniaturized.

Moreover, a molding resin flows through the resin-passing gap in the portion of the positioning means (the fitting portion between the positioning hole and the positioning projection) of the bobbin and the stator, so that the flow of the molding resin can be made uniform in the whole periphery. Occurrence of poor molding can be prevented, and a very reliable electromagnetic actuator can be provided.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF THE PREFERRED EMBODIMENTS

An electromagnetic actuator of a first embodiment includes a bobbin and a stator. The bobbin has a bobbin cylinder around which a coil is wound and a bobbin flange for holding a winding end of the coil at the end of the bobbin cylinder. The stator has a stator cylindrical part inserted in the bobbin, and a stator flange formed so as to extend from the stator cylindrical part toward the outer periphery and magnetically coupled to a yoke disposed on the outer periphery.

The electromagnetic actuator has a mold part obtained by positioning the bobbin and the stator by inserting positioning projections formed in the bobbin flange into positioning holes formed in the stator flange and molding an assembly body of the bobbin around which the coil is wound and the stator with a molding resin.

At least one of the bobbin and the stator has axial gap forming means for forming a predetermined axial gap between the stator flange and the bobbin flange in the axial direction. Further, a resin passage gap which opens in the axial direction is formed between the positioning hole and the positioning projection fitted in the positioning hole.

First Embodiment

A first embodiment in which an electromagnetic actuator of the present invention is applied to an oil flow control valve (hereinbelow, OCV) in a valve variable timing apparatus (hereinbelow, VVT) will be described with reference to the drawings.

Figure 3:
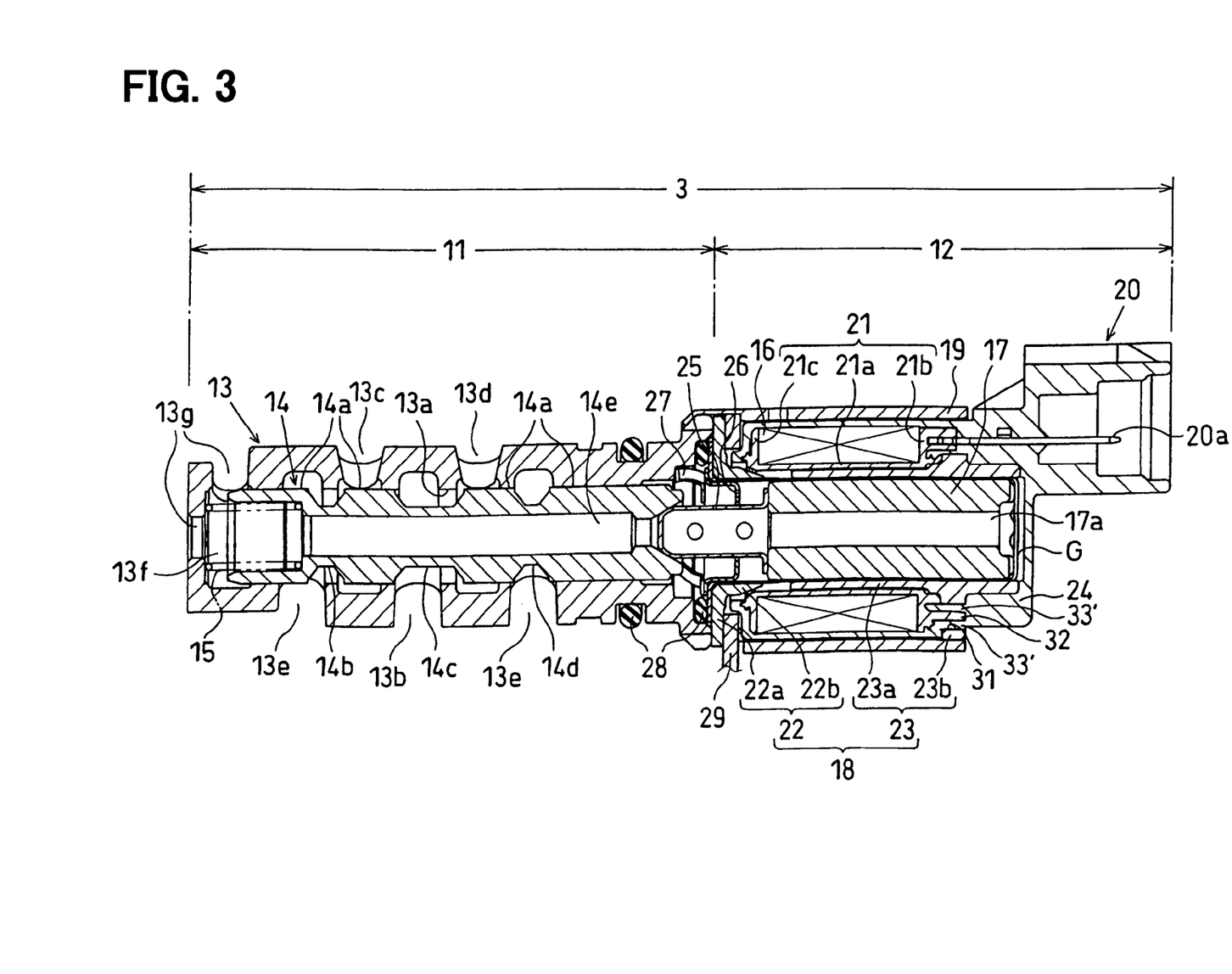
FIG. 3 is a cross section taken in the axial direction of an OCV according to the first embodiment.
Figure 4:
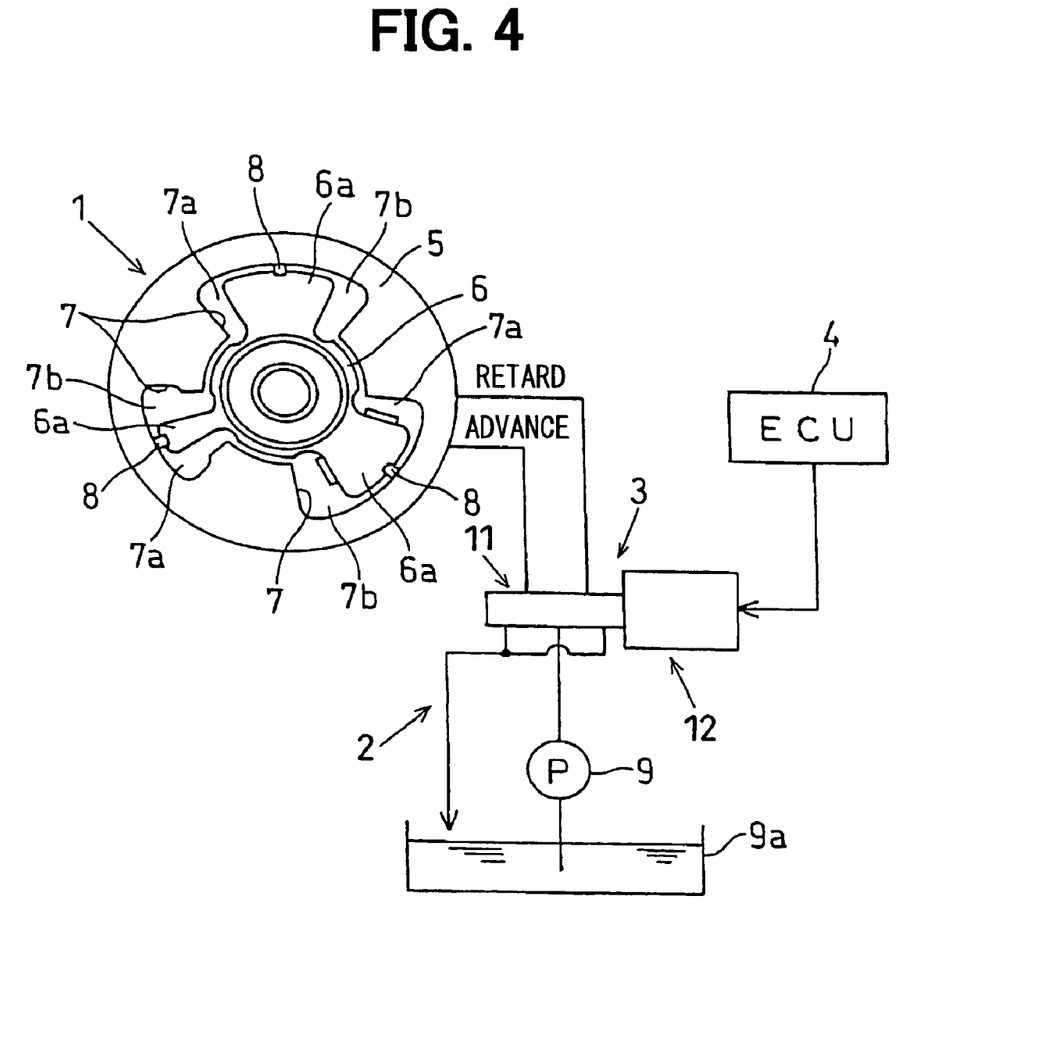
FIG. 4 is a schematic view of a VVT according to the first embodiment.

In the first embodiment, the structure of the VVT will be described first with reference to FIG. 4. Next, the structure of the OCV will be described with reference to FIG. 3. After that, the feature part to which the invention is applied will be described with reference to FIGS. 1A to 1C and FIG. 2.

The VVT includes a valve timing varying mechanism (hereinbelow, VCT) 1 attached to a camshaft (for an intake valve, exhaust valve, or intake/exhaust valve) of an internal combustion engine (hereinbelow, called an engine) and capable of continuously varying timings of opening/closing a valve, a hydraulic circuit 2 for hydraulic-controlling the operation of the VCT 1, and an ECU (Engine Control Unit) 4 for electrically controlling an OCV 3 provided for the hydraulic circuit 2.

The VCT 1 has a shoe housing 5 rotated synchronously with the crankshaft of the engine, and a vane rotor 6 provided rotatable relative to the shoe housing 5 and rotating integrally with the camshaft. The VCT 1 rotates the vane rotor 6 relative to the shoe housing 5 by a hydraulic actuator constructed in the shoe housing 5 to change the camshaft to the advance side or the retard side.

The shoe housing 5 is coupled to a sprocket rotated by the crankshaft of the engine via a timing belt, a timing chain, or the like with a bolt or the like, and rotates integrally with the sprocket. In the shoe housing 5, as shown in FIG. 4, a plurality of (three in the first embodiment) chambers 7 each having an almost fan shape are formed. The shoe housing 5 rotates clockwise in FIG. 4, and this rotation direction is the advance direction.

The vane rotor 6 is positioned at an end of the camshaft by a positioning pin, and is fixed at an end of the camshaft with a bolt or the like, and rotates integrally with the camshaft.

The vane rotor 6 has vanes 6a each partitioning the inside of the chamber 7 in the shoe housing 5 into an advance chamber 7a and a retard chamber 7b. The vane rotor 6 is provided swingably within predetermined angle for the shoe housing 5.

The advance chamber 7a is a hydraulic chamber for driving the vane 6a to the advance side by oil pressure, and is formed in the chamber 7 on the counterclockwise direction side of the vane 6a. On the other hand, the retard chamber 7b is a hydraulic chamber for driving the vane 6a to the retard side by oil pressure. The fluid tightness in each of the chambers 7a and 7b is maintained by a seal member 8 or the like.

The hydraulic circuit 2 is means for supplying/exhausting oil to/from the advance chamber 7a and the retard chamber 7b to generate the oil pressure difference between the advance chamber 7a and the retard chamber 7b and to rotate the vane rotor 6 relative to the shoe housing 5. The hydraulic circuit 2 has an oil pump 9 driven by a crankshaft or the like, and the OCV 3 for supplying oil (oil pressure) pumped by the oil pump 9 while switching the destination between the advance chamber 7a and the retard chamber 7b.

The OCV 3 is an electromagnetic spool valve in which a spool valve 11 and an electromagnetic actuator 12 are coupled to each other.

The spool valve 11 has a sleeve 13, a spool 14, and a return spring 15.

The sleeve 13 has an almost cylindrical shape in which a plurality of input/output ports are formed. Concretely, the sleeve 13 of the first embodiment has an insertion hole 13a for supporting the spool 14 so as to be slidable in the axial direction, an oil pressure supply port 13b communicated with an oil discharge port of the oil pump 9, an advance chamber communication port 13c communicated with the advance chamber 7a, a retard chamber communication port 13d communicated with the retard chamber 7b, and a drain port 13e for sending back the oil into an oil pan 9a.

The oil pressure supply port 13b, advance chamber communication port 13c, retard chamber communication port 13d, and drain port 13e are holes formed in the side face of the sleeve 13. From the left side of FIG. 3 (the side different from the electromagnetic actuator 12) to the right side (the electromagnetic actuator 12 side), the drain port 13e, advance chamber communication port 13c, oil pressure supply port 13b, retard chamber communication port 13d, and drain port 13e are formed in order.

The spool 14 has four large-diameter parts 14a (lands) for interrupting the ports, each having the outside diameter which is almost the same as the inside diameter of the sleeve 13 (the diameter of the insertion hole 13a).

A small-diameter part 14b for draining the advance chamber, a small-diameter part 14c for supplying oil, and a small-diameter part 14d for draining the retard chamber that change the communication states of the plurality of input/output ports (13b to 13e) in accordance with the position in the axial direction of the spool 14 are formed between the large-diameter parts 14a.

The small-diameter part 14b for advance chamber drain is provided to drain the oil in the advance chamber 7a when the oil is supplied to the retard chamber 7b. The small-diameter part 14c for supplying oil is provided to supply the oil to either the advance chamber 7a or the retard chamber 7b. The small-diameter part 14d for draining the retard chamber is provided to drain the oil in the retard chamber 7b when the oil is supplied to the advance chamber 7a.

The return spring 15 is a contracted coil spring for energizing the spool 14 to the right side in FIG. 3 and is disposed between an axial-end wall face of the sleeve 13 and the spool 14 in a spring chamber 13f on the left side of the sleeve 13.

The electromagnetic actuator 12 has a coil 16, a plunger 17, a stator 18, a yoke 19, and a connector 20.

The coil 16 is magnetic force generating means for generating magnetic force when current is passed, and magnetically attracting the plunger 17 to a magnetic attraction stator 22 (which will be described later). The coil 16 is made of an insulator-coated conductor wire (enamel wire or the like) and is wound around a bobbin 21 made of resin.

The bobbin 21 is made of a molding resin and is constructed by a bobbin cylinder 21a around which a coil is wound, and bobbin flanges 21b and 21c holding winding ends in the axial direction (right and left ends in FIG. 3) of the coil 16 at both ends of the bobbin cylinder 21a. The bobbin 21 is formed by pouring a fluid resin (such as PBT) melted by heat to the inside of a resin mold die of the bobbin 21.

The plunger 17 is a cylindrical column made of a magnetic metal (for example, iron: ferromagnetic material used for forming a magnetic circuit) which is magnetically attracted by the magnetic attraction stator 22 (which will be described later). The plunger 17 is slidably supported in the axial direction on the inside of the stator 18 (concretely, the inside of a cup guide G for oil seal).

The stator 18 includes the magnetic attraction stator 22 for magnetically attracting the plunger 17 in the axial direction, and a magnetic reception/transmission stator 23 for receiving/transmitting magnetism from/to the outside of the plunger 17.

The magnetic attraction stator 22 is made of a magnetic metal (for example, iron: a ferromagnetic material used for forming a magnetic circuit). The magnetic attraction stator 22 is formed by a disc part 22a disposed by being sandwiched between the sleeve 13 and the coil 16, and a cylindrical part 22b for guiding the magnetic flux of the disc part 22a to a position near the plunger 17. A magnetic attraction gap (main gap) is formed between the plunger 17 and the cylindrical part 22b in the axial direction.

The cylindrical part 22b is provided so as to be able to cross a part of the plunger 17 in the axial direction without being in contact with the plunger 17. The end of the cylindrical part 22b is tapered and a characteristic is provided such that the magnetic attraction force does not change with respect to the stroke amount of the plunger 17.

The stator 23 is made of a magnetic metal (for example, iron: a ferromagnetic material used for forming a magnetic circuit). The stator 23 is formed by a stator cylindrical part 23a covering the outer periphery of the plunger 17 via a cup guide G and inserted in the bobbin 21, and a stator flange 23b formed so as to extend from the stator cylindrical part 23a toward the outside diameter direction and magnetically coupled to the yoke 19 disposed on the outer periphery. A magnetic flux transmission/reception gap (side gap) is formed in the radial direction between the stator cylindrical part 23a and the plunger 17.

The yoke 19 is made of a magnetic metal (for example, iron: a ferromagnetic material used for forming a magnetic circuit) and has a cylindrical shape covering the periphery of the coil 16. By caulking a nail portion formed on the left side in FIG. 3, the yoke 19 is coupled to the sleeve 13.

The connector 20 is coupling means formed by part of a post-forming resin 24 for resin-molding the coil 16 and the like. On the inside of the connector 20, a connector terminal 20a connected to a conductive wire end of the coil 16 is disposed. The connector terminal 20a is resin-molded with the post-forming resin 24 in a state where its one end is exposed in the connector 20 and the other end is inserted in the bobbin 21.

The OCV 3 has a shaft 25 for transmitting the driving force to the left side in FIG. 3 by the plunger 17 to the spool 14 and transmitting the biasing force of the return spring 15 given to the spool 14 to the plunger 17.

The shaft 25 in the embodiment is a hollow part obtained by processing a metal plate made of a nonmagnetic material (for example, a stainless plate) in a cup shape. Via a hole formed in an end portion of the shaft 25, a spool breathing path 14e formed in the core of the spool 14 and a plunger breathing path 17a formed in the core of the plunger 17 are communicated with each other, and a volume change part on the right side in FIG. 3 of the plunger 17 and a drain port 13g formed in the spring chamber 13f are communicated with each other.

A through hole in the radial direction is formed in a cup side face of the shaft 25 so that the volume change part on the left side in FIG. 3 of the plunger 17 and the drain port 13g formed in the spring chamber 13f are communicated with each other.

The cup member disposed around the shaft 25 and on the inner periphery of the magnetic attraction stator 22 is a magnetic facing part 26 that guides attraction magnetic force of the plunger 17 to the position opposite to the plunger 17. The cup member is obtained by processing a metal plate made of a magnetic material (for example, iron: ferromagnetic material used for forming a magnetic circuit) in a cup shape.

In FIG. 3, a fin member disposed between the magnetic facing part 26 and the sleeve 13 is a plate spring 27 for pressing the magnetic facing part 26 to the right side in FIG. 3.

Further, reference numeral 28 shown in FIG. 3 denotes an O-ring for sealing, and reference numeral 29 denotes a bracket for fixing the OCV 3 to a hydraulic case or the like.

The ECU 4 controls an amount of current (hereinbelow, supply current amount) supplied to the coil 16 of the electromagnetic actuator 12 by duty ratio control. By controlling the amount of current supplied to the coil 16, the position in the axial direction of the spool 14 is linearly controlled. A hydraulic fluid according to the engine operating state is generated in the advance chamber 7a and the retard chamber 7b, thereby controlling the advance phase of the camshaft.

When the ECU 4 makes the camshaft advance in accordance with the vehicle operating state, the ECU 4 increases the amount of current supplied to the coil 16. It makes the magnetic force generated by the coil 16 increase, so that the plunger 17, the shaft 25, and the spool 14 move to the left side (advance side) in FIG. 3. The communication ratio of the oil pressure supply port 13b and the advance chamber communication port 13c increases, and the communication ratio of the retard chamber communication port 13d and the drain port 13e increases. As a result, the oil pressure in the advance chamber 7a increases and, on the contrary, the oil pressure in the retard chamber 7b decreases. The vane rotor 6 shifts to the advance side relative to the shoe housing 5, and the camshaft advances.

On the other hand, when the ECU 4 makes the camshaft retard in accordance with the vehicle operating state, the ECU 4 decreases the amount of current supplied to the coil 16. It makes the magnetic force generated by the coil 16 decrease, and the plunger 17, the shaft 25, and the spool 14 move to the right side (retard side) of FIG. 3. Then, the communication ratio of the oil pressure supply port 13b and the retard chamber communication port 13d increases, and the communication ratio of the advance chamber communication port 13c and the drain port 13e increases. As a result, the oil pressure in the retard chamber 7b increases and, on the contrary, the oil pressure in the advance chamber 7a decreases. The vane rotor 6 shifts to the retard side relative to the shoe housing 5, and the camshaft retards.

Figure 2:
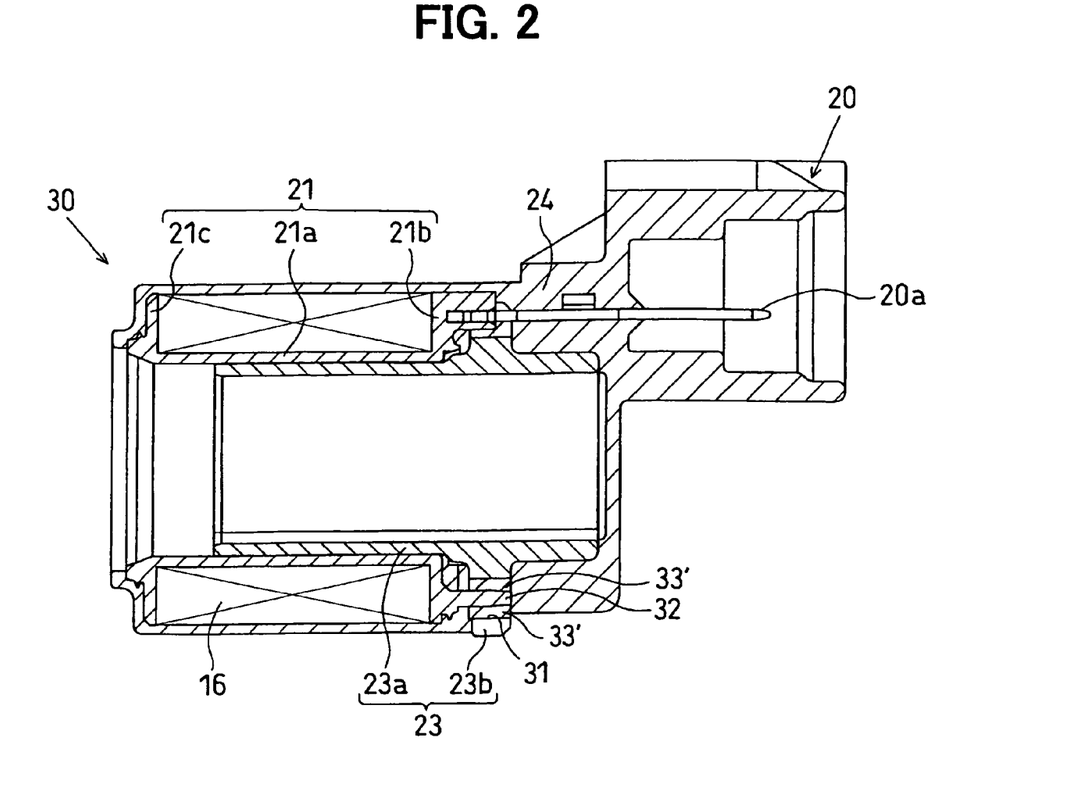
FIG. 2 is a cross section of a mold part in an electromagnetic actuator according to the first embodiment.

A part of a solenoid for generating magnetic force by applying current in the electromagnetic actuator 12 is manufactured as a mold part 30 shown in FIG. 2.

The mold part 30 is obtained by assembling the bobbin 21 and the magnetic transmitting/receiving stator 23. In the bobbin 2, the winding of the coil 16 is completed and assembly of the connector terminal 20a (including electric connection to the coil end) is completed. The assembly body is set in a resin-molding die (molding die that determines the shape of the post-forming resin 24), and a liquid resin (such as PBT) melted with heat is poured into the resin-molding die, thereby forming the mold part 30.

At the time of assembling the bobbin 21 around which the coil 16 is wound and the stator 23, the bobbin 21 and the stator 23 have to have a preliminarily specified position relation.

As positioning means of the bobbin 21 and the stator 23, a plurality of (two in the embodiment) positioning holes 31 are formed in the stator flange 23b, and a plurality of (two in the embodiment) positioning projections 32 are provided for the bobbin flange 21b. By fitting of the positioning holes 31 and the positioning projections 32, the bobbin 21 and the magnetic transmitting/receiving stator 23 are positioned.

Conventional positioning means has a structure that when the positioning projections 32 are fit in the positioning holes 31, the positioning holes 31 are closed with the positioning projections 32. Consequently, in the conventional art, it is necessary to prevent occurrence of poor molding in a resin-passing hole 33.

The resin-passing hole 33 is a passing hole (through hole) for passing the post-forming resin 24 in the axial direction of the stator flange 23b. Since the positioning holes 31 are closed with the positioning projections 32 in the conventional art, a large number of resin passing holes 33 are necessary.

The stator flange 23b is a member through which magnetic flux for magnetically coupling the stator cylindrical part 23a and the yoke 19 passes. Consequently, in a case that the number of resin passing holes 33 is large, the amount of magnetic flux passing through the stator flange 23b decreases, and it disturbs miniaturization of the electromagnetic actuator 12.

The flow of the post-forming resin 24 has to be made uniform in the whole periphery so that poor molding does not occur. In the conventional art, however, the post-forming resin 24 does not flow in the positioning means (the fitting portion between the positioning holes 31 and the positioning projections 32), so that the flow of resin to a portion around the positioning means is hindered and poor molding tends to occur.

In the first embodiment, to solve the problems, the following means is employed.

At least one of the bobbin 21 and the stator 18 has axial gap forming means for forming a predetermined axial gap between the stator flange 23b and the bobbin flange 21b in the axial direction.

Between the positioning hole 31 and the positioning projection 32 fit in the positioning hole 31, a resin-passing gap which opens in the axial direction is formed.

The stator flange 23b has not only the positioning holes 31 but also the plurality of resin passing holes 33 through which the melt post-forming resin 24 passes at the time of performing the resin molding.

The positioning holes 31 and the resin passing holes 33 are disposed in positions extending radially from the center of the stator flange 23b.

The first embodiment will now be concretely described with reference to FIGS. 1A to 1C and 2.

Figure 1A:
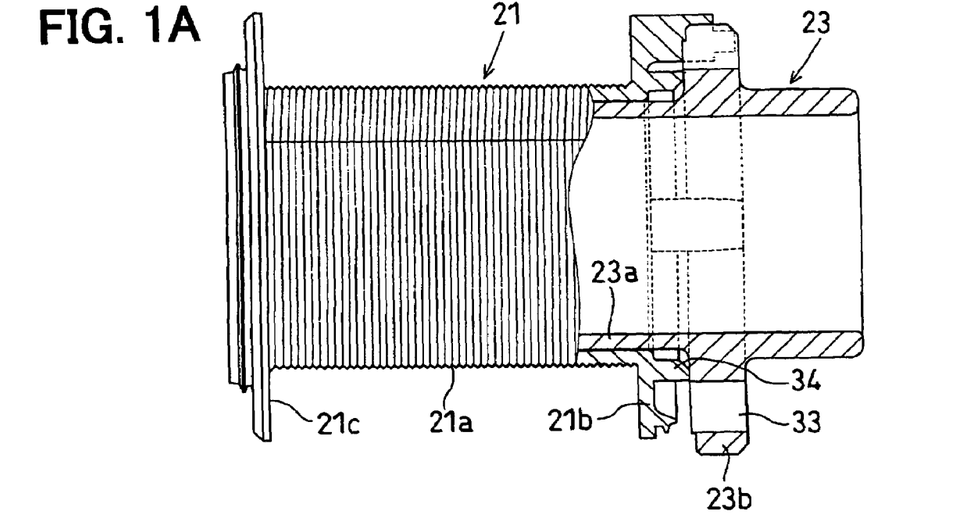
FIGS. 1A, 1B, and 1C are diagrams showing an assembly structure of a bobbin and a stator according to a first embodiment.

The axial gap forming means is provided to form a gap through which the melt post-forming resin 24 can pass between the stator flange 23b and the bobbin flange 21b. In the first embodiment, the axial gap forming means is an axial regulating projection 34 having an annular shape and projected in the axial direction on the inner peripheral side of the bobbin flange 21b. As shown in FIG. 1A, the axial regulating projection 34 is used to form a gap for passing the melt post-forming resin 24 between the stator flange 23b and the bobbin flange 21b in such a manner that the stator 23 and the bobbin 21 are assembled and the tip portion of the axial regulating projection 34 comes into contact with the side face of the stator flange 23b.

Figure 1B:
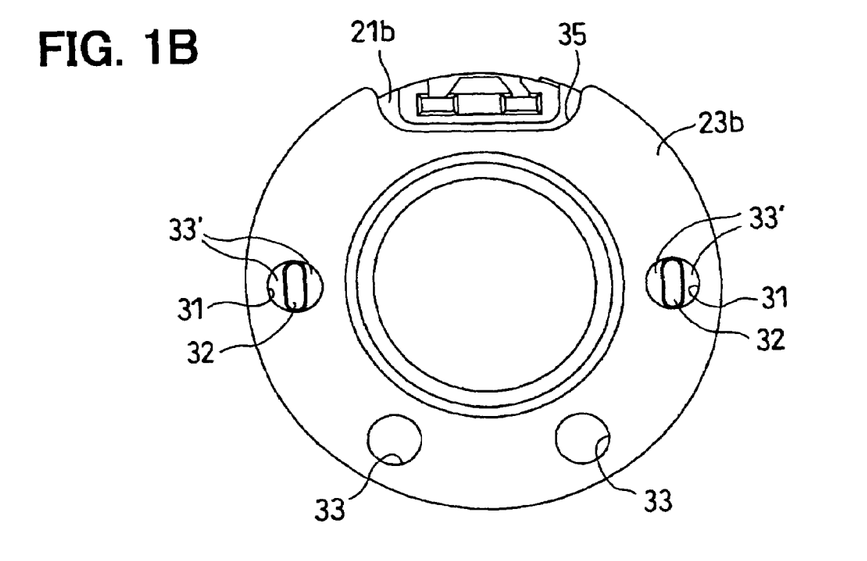
Figure 1C:
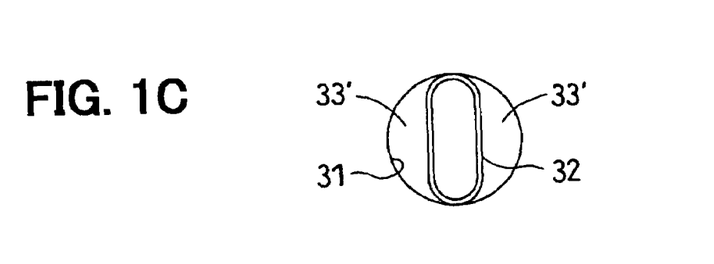

The positioning hole 31 of the first embodiment has a circle shape penetrating in the axial direction as shown in FIGS. 1B and 1C. Two positioning holes 31 are provided in the facing positions in the stator flange 23b.

The positioning projection 32 of the first embodiment has a flat shape which coincides with the diameter part of the circular hole. Concretely, the shape seen in the axial direction of the positioning projection 32 is an ellipse shape flatter than the positioning hole 31 (circular hole). The dimension in the longitudinal direction of the positioning projection 32 (flat oval) seen from the axial direction coincides with the diameter dimension of the positioning hole 31 (circular hole), or the positioning projection 32 (flat oval) is lightly press-fit in the positioning hole 31 (circular hole). The shape of the positioning projection 32 is not limited to a flat oval shape but may be any flat shape which coincides with the diameter part of the circular hole, such as an ellipse.

With such arrangement, in a state where the positioning projections 32 are fit in the positioning holes 31, resin passing gaps 33' which open in the axial direction are formed between the positioning holes 31 and the positioning projections 32. The melt post-forming resin 24 flows in the resin passing gaps 33' at the time of molding. That is, the resin passing gaps 33' in the positioning holes 31 can be used as the same function as that of the resin passing holes 33.

The positioning holes 31 and the resin passing holes 33 are disposed in such a manner as to radially extend from the center of the stator flange 23b as shown in FIG. 1B. The disposing intervals are equal intervals so that the flow of the forming resin 24 is uniform in the whole periphery. Reference numeral 35 in FIG. 1B denotes a connector mounting recess in which the connector terminal 20a penetrates in the axial direction. The connector mounting recess 35 also serves as the axial passing part of the post-forming resin 24.

Specifically, the positioning holes 31, the resin passing holes 33, and the connector mounting recess 35 are arranged with an excellent balance in positions extending radially from the center of the stator flange 23b as shown in FIG. 1B.

In the mold part 30 mounted on the electromagnetic actuator 12 of the OCV 3 of the first embodiment, as described above, the resin passing gaps 33' through which the post-forming resin 24 flows at the time of molding are formed between the positioning holes 31 formed in the stator flange 23b and the positioning projections 32 fit in the positioning holes 31.

Since the resin passing gaps 33' in the positioning holes 31 play the role equivalent to that of the resin passing holes 33, the total number of the positioning holes 31 and the resin passing holes 33 formed in the stator flange 23b can be reduced as compared with that in the conventional art, and the amount of magnetic flux passing through the stator flange 23b can be prevented from decreasing.

Consequently, even when the diameter of the stator flange 23b is made smaller, the magnetic flux amount can be assured, and the electromagnetic actuator 12 can be miniaturized. Since the electromagnetic actuator 12 can be miniaturized, the size of the general body of the OCV 3 can be reduced.

In the part of the positioning means between the bobbin 21 and the stator 23 (the fitting portion between the positioning hole 31 and the positioning projection 32), the post-forming resin 24 flows via the resin passing gap 33'. The positioning holes 31, the resin passing holes 33, and the connector mounting recess 35 are disposed in positions radially extended from the center of the stator flange 23b as shown in FIG. 1B, so that the flow of the post-forming resin 24 can be made uniform in the whole periphery, and occurrence of poor molding can be restricted. Thus, reliability of the electromagnetic actuator 12 is increased and, as a result, the reliability of the OCV 3 can be increased.

The stator flange 23b is provided with two positioning holes 31 each having a circular shape penetrating in the axial direction. The positioning projection 32 has a flat oval shape matching the diameter part of the circular hole.

With the arrangement, only by fitting the positioning projections 32 in the two positioning holes 31, the positioning in the axial direction and the positioning in the circumferential direction between the bobbin 21 and the stator 23 are simultaneously performed.

Second Embodiment

A second embodiment will be described with reference to FIGS. 5A to 5C. In the following, the same reference numerals denote the same function members as those of the first embodiment.

In the first embodiment, the example of forming the positioning hole 31 in a circular shape has been described.

In contrast, in the second embodiment, the positioning hole 31 is formed in a rectangular shape.

Figure 5A:
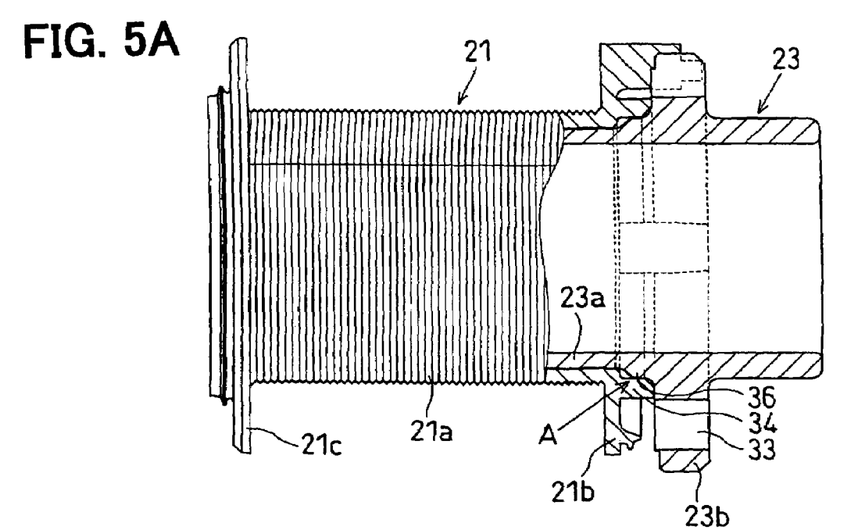
FIGS. 5A, 5B, and 5C are diagrams showing an assembly structure of a bobbin and a stator according to a second embodiment.
Figure 5B:
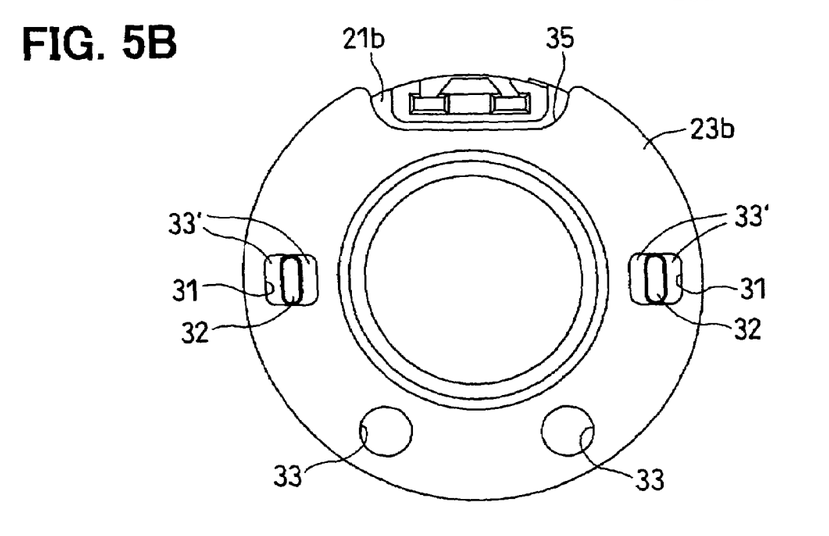
Figure 5C:
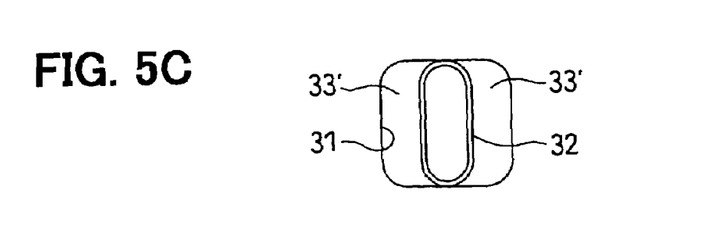

Concretely, the positioning hole 31 of the second embodiment has a rectangular shape penetrating in the axial direction as shown in FIGS. 5B and 5C. In a manner similar to the first embodiment, two positioning holes 31 are provided in facing positions in the stator flange 23b.

The positioning projection 32 of the second embodiment has a flat shape which matches a center portion of the rectangular hole in the circumferential direction. The shape seen in the axial direction of the positioning projection 32 is a flat oval shape which is flatter than the positioning hole 31 (rectangular hole) as shown in FIG. 5C. The dimension in the longitudinal direction of the positioning projection 32 (flat oval) seen in the axial direction coincides with the dimension of a side in the circumferential direction of the positioning hole 31 (rectangular hole), or the positioning projection 32 is lightly press-fit in the positioning hole 31. In a manner similar to the first embodiment, the shape of the positioning projection 32 is not limited to a flat oval shape but may be any flat shape which matches the center portion of the rectangular shape in the circumferential direction, such as an ellipse or a flat plate.

With such arrangement, in a state where the positioning projections 32 (flat oval) are fit in the positioning holes 31 (rectangular holes), resin passing gaps 33' communicating in the axial direction are formed between the positioning holes 31 and the positioning projections 32. Effects similar to the first embodiment can be obtained.

In addition, as described above, the positioning projection 32 (flat oval) matches the positioning hole 31 (rectangular hole) in the circumferential direction. Consequently, by fitting the positioning projection 32 in the positioning hole 31, the positioning in the circumferential direction between the bobbin 21 and the stator 23 can be performed.

In the second embodiment, axis matching means "A" for matching the inside diameter part of the bobbin 21 and the outside diameter part of the stator 18 is provided for at least one of the bobbin 21 and the stator 18.

Concrete axis matching means "A" is a large diameter part 36 formed on the left part of FIG. 5A in the root part of the stator flange 23b. The large diameter part 36 engages with the inner peripheral surface of the axial regulating projection 34 formed in the bobbin flange 21b. The outside diameter of the large diameter part 36 coincides with the inside diameter of the axial regulating projection 34, or the large diameter part 36 is lightly press-fit in the axial regulating projection 34.

With the arrangement, by assembling the bobbin 21 and the stator 23, the inside diameter part of the bobbin 21 and the outside diameter part of the stator 18 match each other by the axial matching means "A" (fitting of the large diameter part 36 and the axial regulating projection 34). Thus, the axial positioning of the bobbin 21 and the magnetic transmitting/receiving stator 23 is performed.

In the second embodiment, by the circumferential fitting between the positioning hole 31 (rectangular hole) and the positioning projection 32 (flat oval) and the axial fitting between the large diameter part 36 and the axial regulating projection 34, the positioning in the circumferential direction and the positioning in the axial direction between the bobbin 21 and the stator 23 are performed.

(Modifications)

Although the stator 18 is comprised of the magnetic attraction stator 22 and the magnetic transmitting/receiving stator 23 in the foregoing embodiments, the magnetic attraction stator 22 and the magnetic transmitting/receiving stator 23 may be provided as a single stator 18.

Although the example of applying the present invention to the OCV 3 used for a VVT has been described above in the foregoing embodiments, the invention can be applied to an OCV for use other than the VVT (for example, an OCV for hydraulic control of an automatic transmission).

Although the example of applying the present invention to an electromagnetic spool valve used as the OCV 3 has been described in the foregoing embodiments, the invention may be applied to an electromagnetic spool used for switching a fluid other than oil, pressure adjustment, flow adjustment, and the like.

Although the example of driving the spool valve 11 by the electromagnetic actuator 12 to which the invention is applied has been described in the foregoing embodiments, the invention may be applied to an electromagnetic actuator for driving a valve mechanism different from the spool valve 11. That is, the present invention can be applied to an electromagnetic actuator for any of electromagnetic valves.

Further, the invention can be also applied to an electromagnetic actuator used for anything other than the electromagnetic valve.

What is claimed is:

1. An electromagnetic actuator comprising:
 a bobbin including a bobbin cylinder around which a coil is wound and a bobbin flange for holding a winding end of the coil at an end of the bobbin cylinder; and
 a stator including a stator cylindrical part inserted in the bobbin and a stator flange extending from the stator cylindrical part toward the outer periphery, the stator flange being magnetically coupled to a yoke disposed its outer periphery,
 wherein the bobbin flange is provided with a positioning projection, and the stator flange is provided with a positioning hole to which the positioning projection is inserted so that the bobbin and the stator are positioned relative to each other and are molded together with a molding resin,
 at least one of the bobbin and the stator has an axial-gap-forming means for forming a predetermined axial gap between the stator flange and the bobbin flange in the axial direction, and
 a resin passing gap which opens in the axial direction is formed between the positioning hole and the positioning projection inserted in the positioning hole.

2. The electromagnetic actuator according to claim 1, wherein the stator flange has, in addition to the positioning hole, a resin passing hole through which a melt molding resin passes at the time of molding, and
 the positioning hole and the resin passing hole are disposed in such a manner as to radially extend from the center of the stator flange.

3. The electromagnetic actuator according to claim 2, wherein the stator flange is provided with a plurality of positioning holes each having a circular hole shape and penetrating the stator flange in its axial direction, and
 the positioning projection has a flat shape which matches a diameter part of the circular hole.

4. The electromagnetic actuator according to claim 2, wherein the stator flange is provided with at least one positioning hole having a rectangular hole shape and penetrating the stator flange in its axial direction,
 the positioning projection has a flat shape matching a center portion of the rectangular hole in the circumferential direction, and at least one of the bobbin and the stator has an axis-matching means for matching an inside diameter of the bobbin and an outside diameter of the stator.

5. The electromagnetic actuator according to claim 1, further comprising a sleeve having a substantially cylindrical shape and a spool movable in the axial direction in the sleeve, the spool being connected to a spool valve to construct an electromagnetic spool valve.

* * * * *